United States Patent
Rubin et al.

(10) Patent No.: US 7,568,191 B2
(45) Date of Patent: Jul. 28, 2009

(54) METHOD AND APPARATUS FOR SUPERWORD REGISTER VALUE NUMBERING

(75) Inventors: Norman Rubin, Cambridge, MA (US); Richard Bagley, Arlington, MA (US)

(73) Assignee: ATI Technologies, Inc., Markham, ON (CA)

( * ) Notice: Subject to any disclaimer, the term of this patent is extended or adjusted under 35 U.S.C. 154(b) by 405 days.

(21) Appl. No.: 10/768,804

(22) Filed: Jan. 30, 2004

(65) Prior Publication Data

US 2005/0198468 A1 Sep. 8, 2005

(51) Int. Cl.
G06F 9/45 (2006.01)
(52) U.S. Cl. .................. 717/151; 717/141; 717/146
(58) Field of Classification Search .............. 717/151
See application file for complete search history.

(56) References Cited

U.S. PATENT DOCUMENTS

| | | | |
|---|---|---|---|
| 5,293,631 A | | 3/1994 | Rau et al. |
| 5,465,374 A | * | 11/1995 | Dinkjian et al. ............ 711/219 |
| 5,475,842 A | | 12/1995 | Gilbert et al. |
| 5,644,709 A | * | 7/1997 | Austin ........................ 714/53 |
| 5,659,754 A | | 8/1997 | Grove et al. |
| 5,761,514 A | | 6/1998 | Aizikowitz et al. |
| 5,768,596 A | | 6/1998 | Chow et al. |
| 5,842,017 A | | 11/1998 | Hookway et al. |
| 6,035,124 A | * | 3/2000 | Ng ............................ 717/146 |
| 6,049,667 A | * | 4/2000 | Bates ........................ 717/138 |
| 6,077,314 A | * | 6/2000 | Ng ............................ 717/159 |
| 6,128,775 A | | 10/2000 | Chow et al. |
| 6,131,189 A | * | 10/2000 | Chow et al. ................ 717/141 |
| 6,571,387 B1 | | 5/2003 | Chow et al. |
| 6,594,665 B1 | * | 7/2003 | Sowa et al. ................ 707/10 |
| 7,213,242 B2 | * | 5/2007 | Robison ..................... 717/151 |
| 2005/0166194 A1 | | 7/2005 | Rubin et al. |
| 2006/0070050 A1 | | 3/2006 | Chen |

OTHER PUBLICATIONS

Value-Driven Redundancy Elimination by Loren Taylor Simpson Apr. 1996.*
Samuel Larsen and Saman Amarasinghe "Exploiting Superword Level Parallism with Mutimedia Instruction Sets" 2000, pp. 145-156.*

(Continued)

*Primary Examiner*—Wei Y Zhen
*Assistant Examiner*—Phillip H Nguyen
(74) *Attorney, Agent, or Firm*—Vedder Price, P.C.

(57) ABSTRACT

A method and apparatus for superword register value numbering includes hashing an operation code and the value numbers of a plurality of sources to generate a flint hash value. The method and apparatus further includes retrieving an operation value number from the first hash table based on the first hash value. The method and apparatus further includes generating a result value number based on a previous bit hash value and the operation value number. The result value number is a combination of the operation value numbers for each component having a live indicator (e.g., a false write mask value) and a previous value numbers for the components without the live indicator (e.g., a true write mask value). Thereupon, the method and apparatus includes searching a second hash table using the result value number. As such, the method and apparatus provides using two separate hash tables for value numbering with superword instructions.

21 Claims, 4 Drawing Sheets

OTHER PUBLICATIONS

Jaewook Shin, Jacqueline Chame, and Mary W. Hall "Compiler-Controlled Caching in Superword Register File for Multimedia Extension Architectures" 2002, pp. 1-11.*

Rosen, Barry K. et al.; Global Value Numbers and Redundant Computations; 1988; pp. 12-27; supplied by the British Library, www.bl.uk.

Cytron, Ron et al.; Efficiently Computing Static Single Assignment Form and the Control Dependence Graph; ACM Trans on Programming Languages and Systems; Mar. 7, 1991; pp. 1-52.

Shin, Jaewook; Chame, Jacqueline; Hall, Mary W., Exploiting Superword-Level Locality in Multimedia Extension Architectures, Journal of Instruction-Level Parallelism 5, Apr. 2003, pp. 1-28, United States.

* cited by examiner

METHOD AND APPARATUS FOR SUPERWORD REGISTER VALUE NUMBERING

FIELD OF THE INVENTION

The present invention relates generally to computer program compilers and more specifically to optimization of machine language code using value numbering with instructions in static single assignment form.

BACKGROUND OF THE INVENTION

In a computer system, a compiler is utilized to convert a software program in a programming language into machine language. A processor then may execute the machine language to perform the operations designated by the software program. However, inefficiencies arise when using compilers due to an overlap of executable instructions within the programming language and subsequent redundancies in the machine language program.

As part of the compiler process, compilers attempt to determine the equivalence of expressions. If two expressions are equivalent, then the second computation can be removed from the program. There are existing techniques that determine equivalence using hash-based value numbers. These techniques are limited because existing techniques only identify equivalence of scalar expressions and do not find equivalence of vectors.

Value numbering is a well known compiler optimization technique. Each unique value computed in a program is assigned a number called a value number. Earlier techniques applied value numbering to each basic block individually; this is termed "local value numbering". For each instruction in the block, value numbering hashes the operation code and the value numbers of the source operands to obtain a unique number representing the output of the instructions. For example, if the instruction is the addition of two elements, a first, element and a second element, the value number is determined by the hash of the combination of the addition command with the first element and the second element.

Once a value is hashed, the resultant hash value is compared with a hash table. If the instruction is redundant, the hash value will already exist in the hash table. When the hash value already exists in the hash table, the re-computation can be replaced with a reference to the previously computed value. Any operator with known constant arguments is evaluated and the resulting value is used to replace any subsequent references.

Further techniques provide for commutativity, algebraic identities, and extending value numbering beyond the local domain. With this latter technique, termed "global value numbering", a stack of hash tables is used such that the value numbering may be performed over multiple blocks of instructions.

There are numerous approaches to hash-based value numbering. These different approaches provide variant techniques on how the instructions are processed, the number of hash tables, when the hash tables are re-initialized, exactly how the value numbers are assigned when an operand is first seen and when value numbering is applied.

None of the current approaches to hash-based value numbering apply to machines with instructions that generate more than one result, and which have registers which can store more than one result. The latter are termed "superword registers". For ease of description, we will work with superword registers that can store four 32-bit values; each storage area of the superword register is a "component"; we label the four components "x", "y", "z", "w". Note though that the method we describe is equally applicable to any combination of superword registers of any size (where "size" is the number of components) and machines with instructions that return any number of results.

One current approach to overcome this limitation of hash-based value numbering is to treat the register result as a single value. This approach ignores the individual components which thereby leads to inefficient code because a result for a first component does not necessarily correspond to a result for any or all of the other components.

A proposed solution to overcome the above-noted limitation of existing hash-based value numbering techniques as applied to superword registers is for the compiler to split each instruction that operates superword instructions into a set of n scalar operations, where n is the number of components of the superword register. This approach is problematic because the number of register allocations needed for the hash-based valued numbering is thereby greatly increased. Also, this approach has a large adverse affect on the compilation time because the number of instructions to be compiled has just been increased by a factor of n.

In a single instruction multiple data (SIMD) processing environment, there are advantages to using a superword register, wherein a superword register includes a hardware resource that can hold a small, but more than one, number of words of data. In one exemplary orientation, the superword register can hold up to 128 bits divided into four floating point elements. In the SIMI processing environment, instructions that operate on superword registers operate in parallel on all elements and therefore are capable of achieving very high performance provided that more than one element contains data.

Application of value numbering can determine which instructions are duplicates However, as compilers using superword registers fail to account for the multiple components, such compilers do not perform value numbering consistent with the benefits of the superword register and therefore fail to enhance on the added benefit and improved processing ability of using the superword register in the SIMD processing environment.

Instructions operating on a superword register can also support specialized features which further complicate the picture. A first such feature is a swizzling operation, wherein the instruction allows for the re-ordering of the superword values, more specifically the components having associated values. A second possible feature is a write mask which indicates which components an instruction writes in the superword register and which components the superword register utilize previous values.

Current hash based value numbering techniques cannot properly and efficiently process instructions associated with superword registers. Therefore, there exists a need for a hash based value numbering approach optimizing compiler operations for instructions associated with superword registers.

DETAILED DESCRIPTION OF A PREFERRED EMBODIMENT

Briefly, a method and apparatus for superword register value numbering includes hashing an operation code, otherwise referred to as an opcode, and the value numbers of all inputs (i.e., operands) to generate a first hash value. The opcode represents the instruction, for exemplary purposes only, and add, multiply, or any other suitable operation. The value numbers of the inputs are the result value numbers for the definitions of these inputs. The method and apparatus further includes retrieving an operation value number from the first hash table based on the first hash value. The operation value number is an n-tuple value number, wherein n represents the number of components of the superword register.

The method and apparatus further includes generating a result value number, which is the combination of the operation value numbers for each component of the superword register which is written and the value numbers for the previous contents of components which are not written. Following this, the method and apparatus includes searching a second hash table using the result value number. As such, the method and apparatus provides using two separate hash tables for value numbering with superword instructions.

Figure 1:
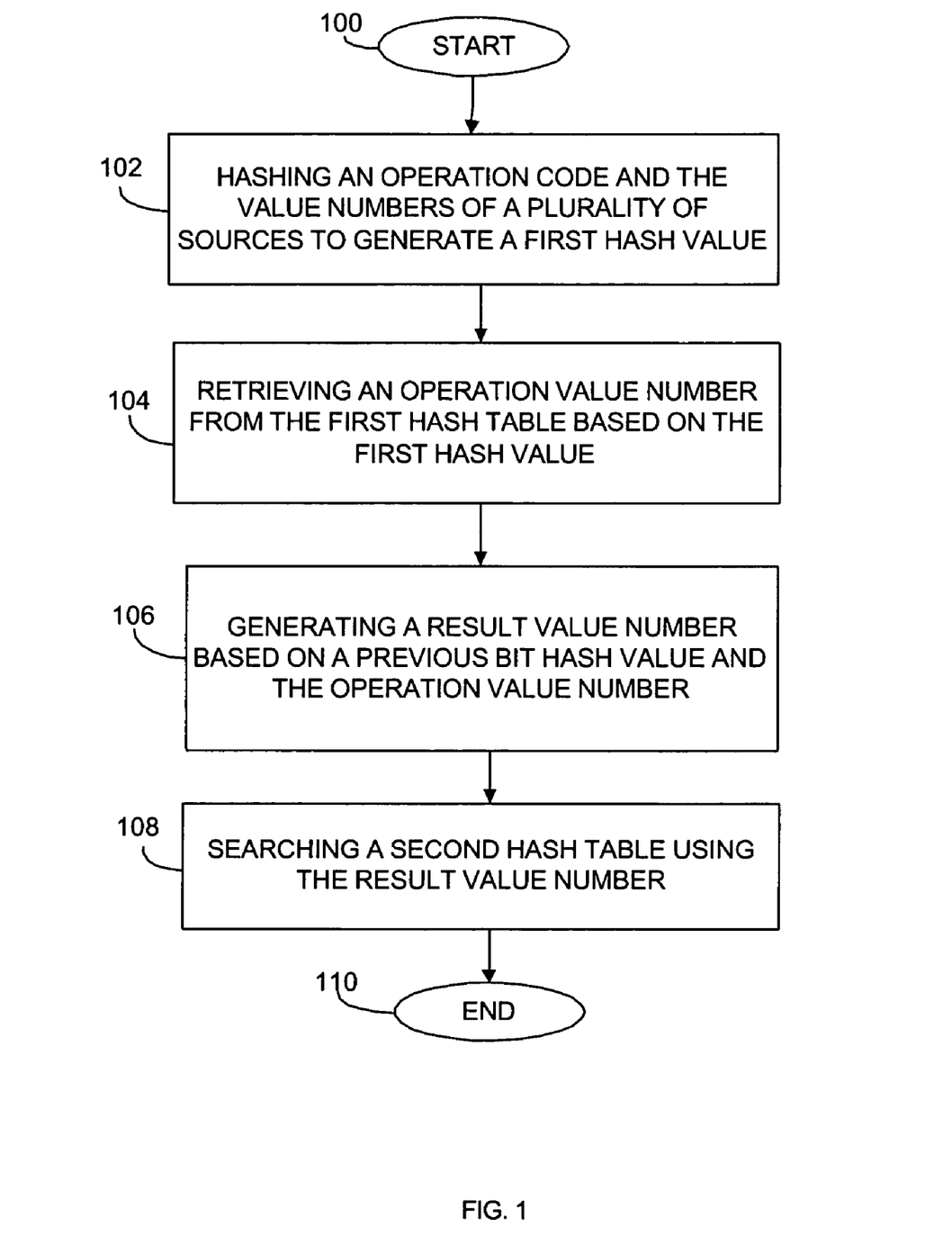
FIG. 1 illustrates a flowchart of a method for superword register value numbering in accordance with one embodiment of the present invention.

More specifically, FIG. 1 illustrates a flowchart of the steps of one method for superword register value numbering. The method begins, step 100, by hashing an operation code and the value numbers of the inputs to the instruction to generate a first hash value, step 102. The representation of an instruction includes a previous bit and a write mask, as described in further detail in the U.S. patent application entitled "Method and Apparatus for Static Single Assignment Form Dead Code Elimination", having application Ser. No. 10/767/480 and a common assignee. Typically the instruction includes two operands and the opcode which may be addition, subtraction, multiplication, division, an equivalence operation, for example a equals b, or any other amiable operation.

Step 104 is retrieving an operation value number from a first hash table based on the first hash value. In one embodiment a hash table may be pre-loaded with hash values or the hash table may be populated during the compilation process. This step is performed by hashing the combination of the value numbers and the opcode using any suitable hashing technique as recognized by one having ordinary skill in the art. Moreover, the step of retrieving is in accordance with known data retrieval techniques, such as any suitable database access routine.

Step 106 is generating a result value number based on a previous value number and the operation value number. The result value number is calculated based on the specific components of the superword register. The write mask is utilized to determine which components are determined by the operation value number components and which components are determined by a previous value number, retrieved from a previous value hash table. The examination of each component, such as the x component, the y component, the z component and the w component in an exemplary 4 component superword register, generates the result value number.

Step 108 is searching a second hash table using the result value number. The second hash table may be preloaded with partial data prior to performing the compilation process or may be populated as the compilation process progresses. The second hash table is accessed and searched using standard database access techniques. In this step, a determination is made as to whether the result value number is within the second hash table, which indicates if the particular instruction has been previously encountered. Through the utilization of two separate hash tables, the superword instruction may be efficiently subjected to value numbering techniques. Thereupon, in this embodiment the method is complete, step 110.

Figure 2:
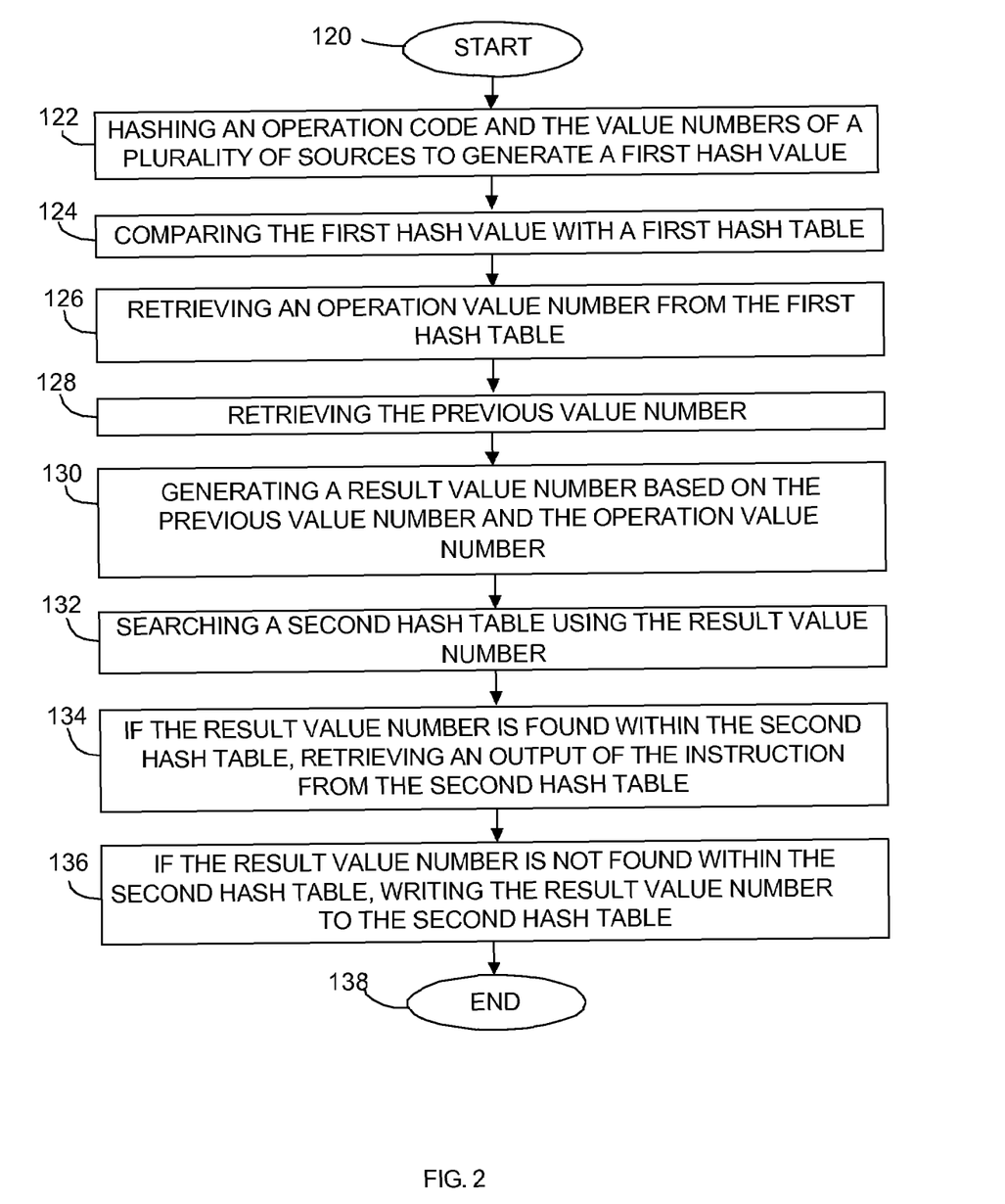
FIG. 2 illustrates a flowchart of a method for superword register value numbering in accordance with another embodiment of the present invention.

FIG. 2 illustrates another embodiment of the present invention of the method for superword register value numbering. The method begins, step 120, by hashing an operation code and value numbers of a plurality of sources to generate a first hash value, step 122. The step is similar to step 102 of FIG. 1. Step 124 is comparing the first hash value with a first hash table. This step may be performed using any suitable table accessing technique using the first hash value with the first hash table.

If an entry for the first hash value is found within the first hash table, step 126 is retrieving an operation value number from the first hash table. The operation value number is a n-tuple number, where n corresponds to the number of components of the superword register. Therefore, the operation value number contains a value for each of the components. In the event a hash table entry is not located, the operation value number is generated for the first hash value, wherein the new operation value is the n-tuple number. This operation value number is written to the first hash table.

Step 128 is retrieving the previous hash value number. This step is performed, in one embodiment, by hashing the previous bit in the instruction. The hashed previous bit is then provided to a previous bit hash table for accessing the table in accordance with known database access techniques and a previous value number is retrieved.

Step 130 is generating a result value number based on the previous value number and the operation value number, which is similar to step 106 of FIG. 1. For each component of the superword register, both a value number corresponding to the previous bit, and a value number corresponding to the operation value number are on hand. The result value for the component is chosen fro the two; if the component is being written to by the current instruction, the operation value number is selected. Otherwise the previous value number is selected. The result is an n-vector of value numbers.

Step 132 is searching a second hash table using the result value number, which is similar to step 108 of FIG. 1. Step 134 is if the result value number is found within the second hash table, retrieving an output of the instruction from the second hash table. The output of the instruction is the resulting operation of the opcode and the operands (including the previous value number). For example, if the opcode is addition, the output would be the sum of the value numbers. In this second hash table, the value numbers are mapped to particular instructions. Furthermore, if the result value is found, this indicates that the instruction has been previously encountered and is therefore redundant so that the output of the instruction currently found within the second hash table may be used in place of the current instruction.

Step 136 is if the result value number is not found within the second hash table, writing the result value number to the second hash table. This operation allows for the population of the hash table by mapping a particular instruction to value numbers. Moreover, this provides the effect of noting that the present instruction is encountered and that any future encounters of this particular instruction would therefore be redundant. Thereupon, the method is complete, step 138.

Figure 3:
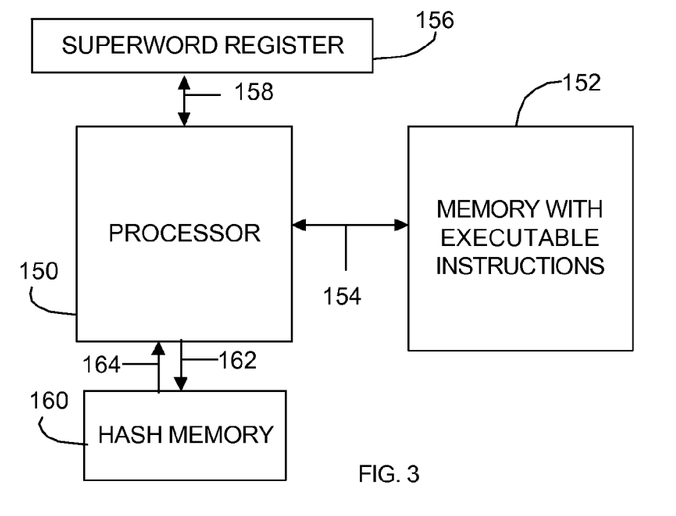
FIG. 3 illustrates a schematic block diagram of an apparatus for superword register value numbering in accordance with one embodiment of the present invention.

FIG. 3 illustrates an apparatus for superword resister value numbering. A processor 150 is operatively coupled to a memory 152. The memory stores executable instructions 154 therein. The processor 150 may be, but is not limited to, a single processor, a plurality of processors, a DSP, a microprocessor, an ASIC, a state machine, or any implementation capable of processing and executing software. The term processor should not be construed to refer exclusively to hardware capable of executing software, and may implicitly include DSP hardware, ROM for storing software, RAM, and any other volatile or non-volatile storage medium. The memory with executable instructions 152 may be, but not limited to, a single memory, a plurality of memory locations, shared memory, CD, DVD, ROM, RAM, EEPROM, optical storage, microcode or any other non-volatile storage capable of storing digital data for use by the processor 150.

The executable instructions 154 are provided to the processor 150 such that the processor 150 performs operations in response thereto. In one embodiment, the processor 150 performs compiler operations to convert programming language instructions into machine language instructions. The processor 150 is further operative to perform the steps of the methods illustrated in FIGS. 1 and 2 and processes discussed above as associated with the methods for superword register value numbering. Therefore, the methods discussed above may be fully implemented and executed by the processor 150 in response to the executable instructions 154.

In one embodiment of the present invention, the processor 150 is further coupled to a superword register 156, wherein the superword register may be a single hardware resource capable of holding a limited number of words of data. The processor 150, through performing the method steps discussed above with regards to FIGS. 1 and 2, reads and writes register values 158 to the superword register for tracking the status of the various superword components.

Furthermore, the processor 150 is operably coupled to a hash memory 160 which may be, but is not limited to, a single memory, a plurality of memory locations, shared memory, CD, DVD, RAM, optical storage, microcode or any other non-volatile storage capable of storing digital data. The hash memory 160 stores the hash tables, as discussed above with regards to FIGS. 1-2 and receives hash values 162 from the processor 150 and provides value numbers 164 to the processor 150.

Thereupon, once the processor 150 compiles a program code software into machine language, the compiled instructions are then designated on a component level, for example x, y, z, and w. In the SIMD environment, the instructions may then be efficiently provided to their corresponding processors, such as an x component processor, a y component processor, a z component processor and a w component processor, using the superword register 156.

Figure 4:
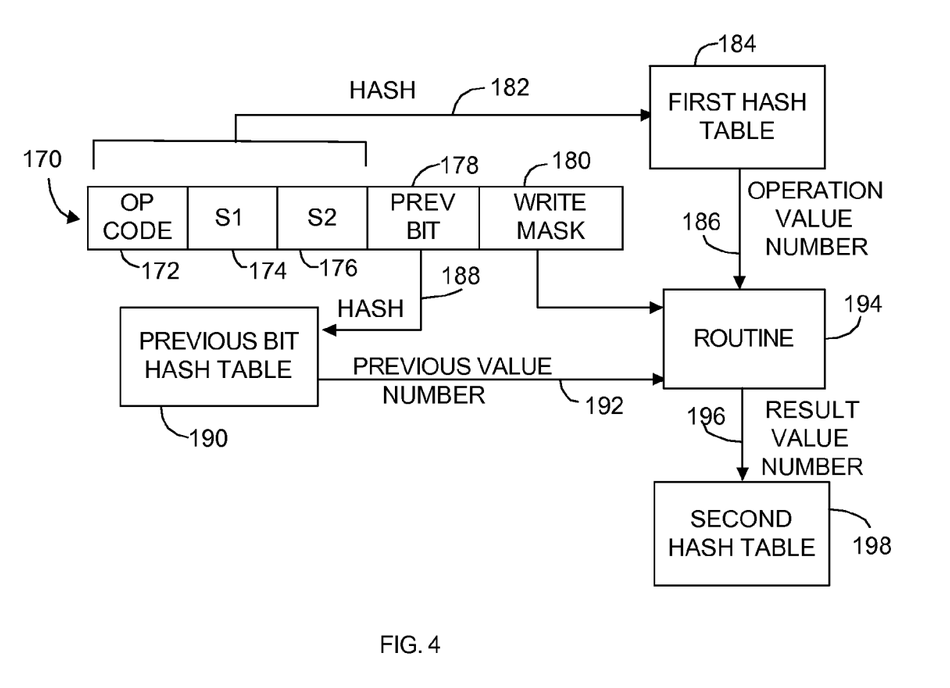
FIG. 4 illustrates a block diagram of the method for superword register value numbering in accordance with one embodiment of the present invention.

FIG. 4 illustrates a graphical representation of the superword value registering of one embodiment of the present invention. An instruction 170 includes an operation code 172, a first value number 174, a second value number 176, a previous bit 178 and a write mask 180. The operation code 172, the first value number 174 and the second value number 176 are hashed using any suitable hashing technique. The hash value 182 is provided to the first hash table 184. In accordance with standard database access techniques, if the hash value 182 is found, an operation value number 186 is retrieved therefrom. If the hash value 182 is not found within the first hush table 184, the operation value number 186 is generated, as discussed above, written to the first hash table 184 and then retrieved therefrom.

The previous bit 178 is hashed using any suitable hashing technique and a hashed previous bit 188 is provided to a previous bit hash table 190. Using standard database access techniques, a previous value number 192 is retrieved from the previous bit hash table 190.

A routine 194 thereupon performs an operation on the operation value number 186, the previous value number 192 and the write mask 180. The routine 194 is based on the per component delineation of the superword register. For each component, a determination is made if the write musk indicated that the value is to effected by the instruction, for example set to a true value. If the component is to be effected, a result value number 196 for that component is the operation value number for that component. If the component is not to be effected, the result value number 196 for that component is the previous value number for the component. For example, if the instruction is directed to the y component and the z component in a four component superword register, the x and w components would be the previous x and the previous w values and the y and z components would be the operation value number y and z component.

The result value number 196 is provided to a second hash table 198. The second hash table 198 utilizing existing database access techniques to determine if the result value number 196 is stored therein. If the result value number 196 is stored therein, this means the instruction 170 is redundant and the instruction 170 can be mapped to the existing result value number within the second hash table 198. If the result value number 196 is not found within the second hash table 198, this entry is then stored therein and mapped to instruction 170.

Figure 5:
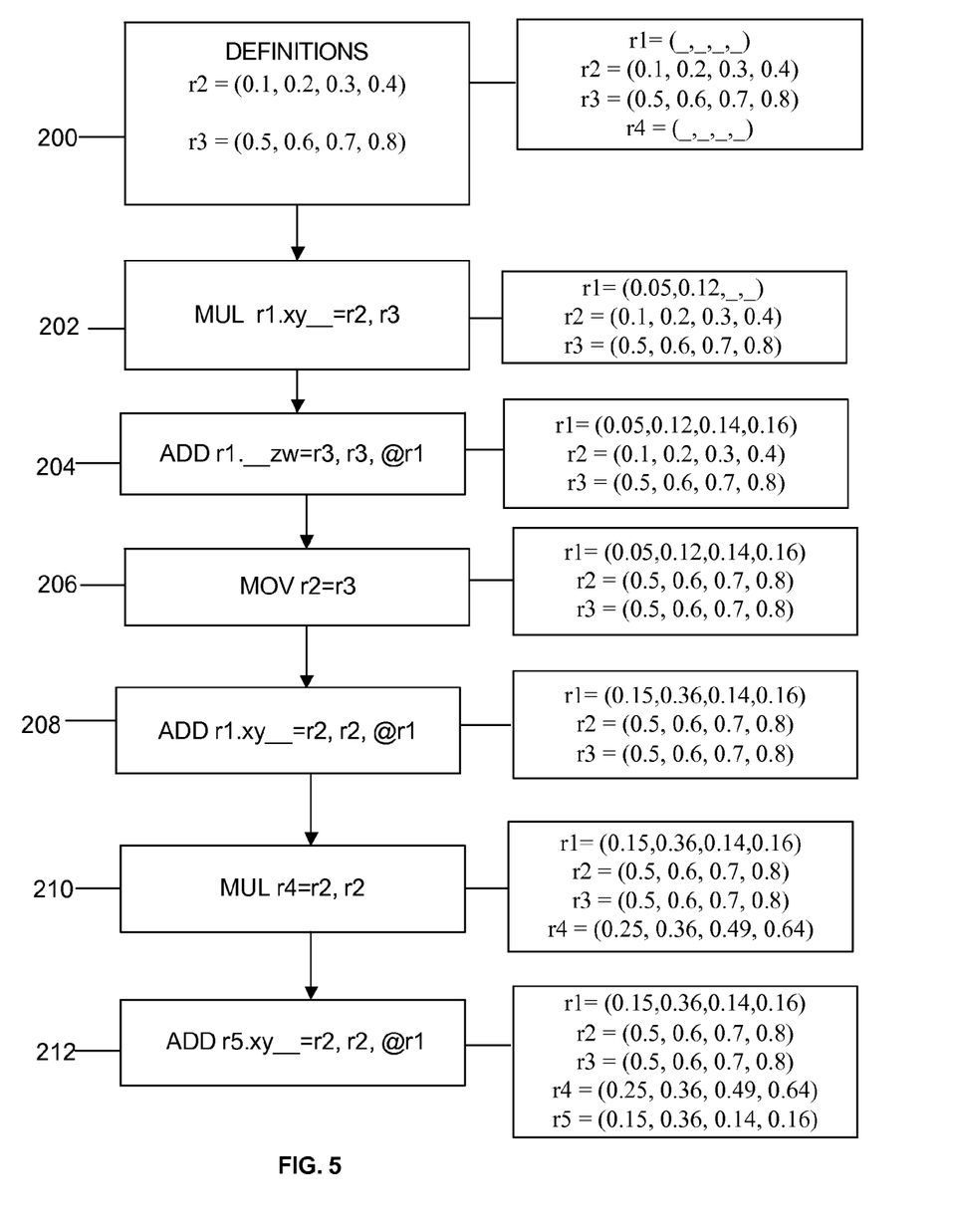
FIG. 5 illustrates a graphical representation of a plurality of decision trees of instructions for the application of the superword register value numbering.

FIG. 5 illustrates a flowchart of one embodiment of the present invention. Using an exemplary four-word superword register, the first step is defining two exemplary variables r2 and r3 for each of the registers, or components. The steps of FIG. 5 represent programming instructions that may be consumed by a compiler to generate machine language. In step 200, the variable r2 is equivalent to (0.1, 0.2, 0.3, 0.4) and r3 is equivalent to (0.5, 0.6, 0.7, 0.8) for the registers (x, y, z, w). It should also be noted that the underscore "_" indicates a particular register nut being written to, otherwise referred to as masked off. Also, previous value numbers are denoted by the symbol "@". It is also noted that for each step, new defined values for the variables r1 through r5 are illustrated in accompanying boxes right of the instruction, where applicable.

Step 202 is to multiply r2 and r3 to generate the variable r1 for the x and y registers because the x and y registers are not masked off (e.g., the write mask value is false for the x and y registers). As noted in step 202, registers z and w are masked off (e.g., the write mask value is true for the z and w registers). Step 204 is adding r3 with r3 with the previous bit r1. At noted in step 204, the addition is specific for register z and w and registers x and y are masked off.

Step 206 is moving the contents of the register associated with r3 to the register associated with r2. Step 208 is adding r2 with r2 with the previous bits of r1. As noted in step 208, the z and w registers are masked off and the addition is performed for the x and y registers. Step 210 is squaring the registers of r2 to compute registers for r4. As noted, step 210 does not contain any of the four registers masked off. Step 212 is adding r2 with r2 with the previous bits of r1. As noted in step 212, the z and w bits are masked off.

Therefore, in accordance with the superword register value numbering of the present invention, step 212 will have the same operational values as step 204. However, step 208 will not have the same result values as step 204, as illustrated by the accompanying register values for steps 204 and 208. Step 212 will have the same operation values as step 204 and will also have the same result values as step 208, as illustrated by the accompanying register values for steps 204 and 212. Therefore, it can be determined that step 212 may be replaced by step 208 because it is redundant. As such, any compilation performed for step 212 will be performed for step 208. Furthermore, if there are no more compilations for step 210, step 210 may be removed as well.

Therefore, by using a double hashing technique, the present invention allows for superword register value numbering. Previous techniques failed to account for all components of a superword register. The generating of the operation value number and the result value number allows for more efficient compilation of program language instructions with the usage of the first hash table and the second hash table, the second hash table storing a per component based result value number mapped to the SSA form instruction. Thereupon, through more efficient compilation, the processing speed for compiling data using a superword register for a SIMD environment is increased.

It should be understood that the implementation of other variations and modifications of the invention in its various aspects will be apparent to those of ordinary skill in the art and that the invention is not limited by the specific embodiments described herein. For example, any suitably sized superword register may be utilized and therefore the operation value number, the previous bit number, the write mask and the result value numbers will contain the corresponding number of components. It is therefore contemplated to cover by the present invention, any and all modifications, variations, or equivalents that fall within the spirit and scope of the basic underlying principles disclosed and claimed herein.

What is claimed is:

1. A method comprising:
   hashing an instruction that comprises an operation code and corresponding operand value numbers to generate a first hash value;
   retrieving an operation value number from a first hash table based on the first hash value, said first hash value mapping to said operation value number in said first hash table, wherein said operation value number corresponds to an operation of said operation code on said corresponding operand value numbers, and wherein said operation value number further corresponds to components contained by a superword register;
   generating a result value number based on a previous value number and the operation value number wherein said result value number is a combination of operation value numbers, wherein said previous value number corresponds to at least one additional component contained by said superword register that was not changed by said operation of said operation code on said corresponding operand value numbers; and
   determining if an instruction, wherein said instruction comprises an operation code and corresponding operand value numbers, is redundant by searching a second hash table using the result value number.

2. The method of claim 1 further comprising:
   when the result value number is found within the second hash table, retrieving an output of the instruction from the second hash table.

3. The method of claim 1 further comprising:
   when the result value number is not found within the second hash table, writing the result value number to the second hash table.

4. The method of claim 1 further comprising:
   prior to generating a result value number, retrieving the previous value number.

5. The method of claim 1 further comprising:
   prior to retrieving the operation value number, comparing the first hash value with a first hash table.

6. The method of claim 5 further comprising:
   when the first hash value is not within the first hash table, assigning the first hash value a multiple component hash value.

7. The method of claim 1 wherein the operation value number is an n-tuple number.

8. The method of claim 1 wherein: the instruction further includes a write mask: and wherein
   generating the result value number includes, for each component in the write mask:
      if the write mask value is false, setting the result value number equal to the operation value number; and
      if the write mask value is true, setting the result value number equal to the previous value number.

9. The method of claim 1 wherein the instruction further including a previous bit and a write mask.

10. An apparatus for superword register value numbering, the apparatus comprising:
    at least one memory device storing a plurality of executable instructions wherein each instruction of said plurality of instructions comprises an operation code and corresponding operand value numbers; and
    at least one processor operably coupled to the at least one memory device, operative to receive the plurality of executable instructions such that the processor, in response to the executable instructions and for an instruction having an operation code and value numbers of a plurality of sources:
       hashes an operation code and corresponding operand value numbers to generate a first hash value;
       retrieves an operation value number from a first hash table based on the first hash value, said first hash value mapping to said operation value number in said first hash table, wherein said operation value number corresponds to an operation of said operation code on said corresponding operand value numbers, and wherein said operation value number further corresponds to components contained by a superword register;
       generates a result value number based on a previous value number and the operation value number wherein said result value number is a combination of operation value numbers, wherein said previous value number corresponds to at least one additional component contained by said superword register that was not changed by said operation of said operation code on said corresponding operand value numbers; and
       determines if the instruction is redundant by searching a second hash table using the result value number.

11. The apparatus of claim 10 wherein the at least one processor further in response to the executable instructions:
    when the result value number is found within the second hash table, retrieves an output of the instruction from the second hash table.

12. The apparatus of claim 10 wherein the at least one processor further in response to the executable instructions:

when the result value number is not found within the second hash table, writes the result value number to the second hash table.

13. The apparatus of claim 10 wherein the at least one processor further in response to the executable instructions:
   prior to generating a result value number, retrieves the previous value number.

14. The apparatus of claim 10 wherein the at least one processor further in response to the executable instructions:
   prior to retrieving the operation value number, compares the first hash value with a first hash table.

15. The apparatus of claim 14 wherein the at least one processor further in response to the executable instructions:
   when the first hash value is not within the first hash table, assigns the first hash value a multiple component hash value.

16. The apparatus of claim 10 wherein: the instruction further includes a write mask; and wherein when the at least one processor generates the result value number, the at least one processor further in response to the executable, and for each component in a write mask:
   sets the result value number equal to the operation value number if the write mask value is false; and
   sets the result value number equal to the previous value number if the write mask value is true.

17. The apparatus of claim 10 further comprising:
   a superword register operably coupled to the processor, the superword register operative to store a plurality of instructions therein.

18. The apparatus of claim 10 further comprising:
   at least one hash memory device operably coupled to the at least one processor such that the at least one hash memory device is operative to store the first hash table and the second hash table.

19. A method comprising:
   hashing an instruction that comprises an operation code and corresponding operand value numbers to generate a first hash value;
   comparing the first hash value with a first hash table to determine if said first hash value is present in said first hash table;
   retrieving an operation value number from the first hash table based on said first hash value, said first hash value mapping to said operation value number is said first hash table, wherein said operation value number corresponds to an operation of said operation code on said corresponding operand value numbers, and wherein said operation value number further corresponds to components contained by a superword register;
   retrieving a previous value number, wherein said previous value number corresponds to at least one additional component contained by said superword register that was not changed by said operation of said operation code on said corresponding operand value numbers;
   generating a result value number based on the previous value number and the operation value number wherein said result value number is a combination of operation value numbers;
   searching a second hash table using the result value number;
   if the result value number is found within the second hash table, retrieving an output of an instruction from the second hash table; and
   if the result value number is not found within the second hash table, writing the result value number to the second hash table.

20. The method of claim 19 further comprising:
   when the first hash value is not within the first hash table, assigning the first hash value a multiple component hash value.

21. The method of claim 19 wherein: the instruction further includes a write mask; and wherein generating the result value number includes, for each component in the write mask:
   if the write mask value is false, setting the result value number equal to the operation value number; and
   if the write mask value is true, setting the result value number equal to the previous value number.

* * * * *